United States Patent [19]
Brown

[11] Patent Number: 4,717,977
[45] Date of Patent: Jan. 5, 1988

[54] HIGH CAPACITY WINCHESTER DISK DRIVE

[75] Inventor: Kenneth H. Brown, Simi Valley, Calif.

[73] Assignee: Micropolis Corporation, Chatsworth, Calif.

[21] Appl. No.: 911,637

[22] Filed: Sep. 25, 1986

[51] Int. Cl.$^4$ ............................................. G11B 17/02
[52] U.S. Cl. ........................................ 360/98; 360/135
[58] Field of Search ............................ 360/98, 133, 135

[56] References Cited

U.S. PATENT DOCUMENTS

| | | | |
|---|---|---|---|
| 4,285,016 | 8/1981 | Gilovich | 360/98 |
| 4,639,802 | 1/1987 | Neubauer et al. | 360/98 |
| 4,672,487 | 6/1987 | Brand et al. | 360/98 |

Primary Examiner—Robert S. Tupper
Attorney, Agent, or Firm—Poms, Smith, Lande & Rose

[57] ABSTRACT

A digital storage system of the Winchester or hard disk drive type has the hard aluminum disks mounted around the drive motor. To accommodate the difference in thermal coefficients of expansion of the steel cylinder forming the outer periphery of the motor, and the aluminum disk assembly, an aluminum disk mounting sleeve is provided which extends for the full height of the disk assembly, and makes a thermal shrink fit around the steel motor cylinder, with the engagement between the two parts being limited to a section toward the center of the overlapping surfaces of the two parts. The aluminum storage disks and spacers between them have a slight clearance from, and are clamped between the top and bottom of the aluminum mounting sleeve.

18 Claims, 3 Drawing Figures

HIGH CAPACITY WINCHESTER DISK DRIVE

FIELD OF THE INVENTION

This invention relates to digital storage systems of the Winchester or hard disk drive type.

BACKGROUND OF THE INVENTION

Digital data may be stored on flexible or "floppy" disks or on hard or Winchester-type disks by the magnetization of successive small areas on the magnetic surface of the disk, by a magnetic head or "slider", as the disk rotates. The density of digital storage on hard disk memory systems is in the order of 10 or 20 times the density achieved with floppy disk memory systems.

In the field of hard or Winchester-type disk systems, the disks are normally formed of aluminum, and have a magnetizable coating on their upper and lower surfaces.

Rigid or Winchester-type magnetic storage disks were originally relatively large in diameter, but in the last few years the size has been reduced, so that 5¼ inch disk systems are now widely available. Further, industry standard dimensions have been established for 5¼ inch Winchester-type disk units, and these dimensions include a height of 3.25 inches or 82.6 millimeters, a width of 5.75 inches, or 146 millimeters, and a depth of 8.00 inches, or 203 millimeters. In addition, the industry standard for weight is six pounds, or 2.7 kilograms. Environmental standards have also been established, with the operating temperature extending from 10 degrees C. to 50 degrees C. and the non-operating or storage temperature extending from −40 degrees C. to +65 degrees C.

By using a flat type of drive motor, it has previously been possible to mount five hard disks of the 5¼ inch size within the industry standard dimensions mentioned hereinabove. This type of configuration would provide a storage capacity in the order of 170 megabytes.

It appears, however, that computers are "insatiable" in their demands for additional rapid access storage, and accordingly, there is a demand for 5¼ inch disk drives with larger capacities. One way of increasing the number of disks which may be included within the industry standard dimensions is to locate the drive motor centrally with respect to the storage disks, with the disks being directly secured to the motor rotor. However, the motor involves magnetic material, usually steel, and the storage disks are normally made of aluminum, coated of course with a magnetizable material. Unfortunately, the thermal coefficient of expansion of iron or steel is in the order of six to nine microinches per inch per degree Fahrenheit; whereas the thermal coefficient of expansion of aluminum is in the order of 11 to 13 microinches per inch per degree Fahrenheit. Over the range of temperatures through which the disk drive is to be operative, if the aluminum disks were to be rigidly mounted to an outer steel cylinder forming part of the motor rotor, the difference in thermal expansion would cause the disks to flex or deform, so that the precision digital memory would not operate reliably. In this regard, it is noted that one of the disk surfaces is normally reserved for servocontrol, so that normal and uniform expansion and contraction of the aluminum disks, without deformation or buckling, causes no problem. However, if the disks flex, or depart from their normal flat surface configuration, reliability will suffer severely, or the units may become wholly inoperative for digital storage. It is also noted that, if steel bearings were to be used on a steel shaft, to directly mount an aluminum disk assembly, the differential thermal expansion of the aluminum and steel could drastically change the bearing pre-load and significantly alter the dynamic characteristics of the disk drive.

Accordingly, a principal object of the present invention is to overcome the problems arising from differential thermal expansion, for example, when aluminum memory disks are employed with a central motor having a steel frame or outer cylindrical portion of the rotor, as outlined hereinabove.

SUMMARY OF THE INVENTION

In accordance with the present invention, a high capacity Winchester or hard disk drive includes a central motor including an outer cylindrical steel member forming part of the motor rotor, and an aluminum disk mounting sleeve having a substantial length which is coextensive with the steel member forming a part of the rotor and with the aluminum mounting sleeve being secured to the cylindrical steel member toward the center of their overlapping areas and having a clearance between the aluminum sleeve and the steel member at their two ends. In addition, a series of aluminum storage disks having magnetic coatings on their surfaces, are mounted from the upper and lower ends of the aluminum mounting sleeve with the storage disks being aligned with and spaced from one another and having a clearance from the periphery of the aluminum mounting sleeve.

As an additional feature of the invention, the aluminum mounting sleeve may make a thermal shrink fit engagement with the cylindrical steel member forming part of the rotor.

As a preferred method of securing the aluminum storage disks to the aluminum mounting sleeve, the aluminum mounting sleeve is provided with a flange at one end, and a circular clamping member is provided at the other end of the aluminum mounting sleeve, with this circular clamping member being fastened with cap screws into the end of the aluminum sleeve, and applying force to the storage disks and intermediate spacing members at their inner edges and clamping them down onto the flange at the other end of the aluminum mounting sleeve.

With the outer diameter of the steel cylinder member being in the order of 1⅜ or 1½ inch, and the axial overlapping area of the steel cylindrical member and the aluminum mounting sleeve being in the order of slightly less than two inches, the central portion including about an inch of the overlapping portions of the steel member and the aluminum sleeve, may be secured together with clearance between the parts for the upper and lower one-half inch. Thus, approximately ½ of the overlapping areas are secured together in the vicinity of the center of the two members, and the upper and lower ¼ of the overlapping areas may be left free of engagement with clearance. More generally, the areas which are secured together may range from approximately ¼ or ⅓ of the central overlapping areas up to about ¾ thereof, with the remainder at the two ends being provided with clearance.

Considering the structure from a thermal expansion standpoint, with the thermal coefficient of expansion for aluminum being assumed to be 12 microinches per inch per degree Fahrenheit, and that of iron or steel to be in the order of 8 microinches per inch per degree Fahrenheit, the difference would be about 4 microinches per inch per degree Fahrenheit. Assuming a temperature range of approximately 50 degrees Centigrade, or approximately 112 degrees Fahrenheit, the differential thermal expansion would be approximately 448 microinches. Using the design of the present invention, as described hereinabove, the actual departures from the normal dimension of the aluminum sleeve through a 50 degree C. temperature range, at the upper and lower ends of the aluminum mounting sleeve are in the order of 10 microinches or less. It is also noted that the present invention prevents changes in bearing pre-load due to differential thermal expansion.

It is also noted that, in practice, the shrink fit between the aluminum sleeve, which has a higher coefficient of thermal expansion, and the steel cylinder forming part of the rotor, is accomplished at approximately 300 degrees Fahrenheit. It is further noted that the clearance between the outer surface of the sleeve, and the inner surface of the disks as clamped around the sleeve is preferably in the order of 0.022 inch; however, any spacing which is sufficient to avoid engagement between the aluminum mounting sleeve and the surrounding aluminum disks, during the desired thermal cycling range, is satisfactory. Incidentally, the disks may be held concentrically with the appropriate spacers between the disks also being held, from their outer peripheries, concentric with the motor, during the clamping process, in order to assure proper alignment, and clearance between the inner surface of the disks and spacers, and the outer surface of the aluminum mounting sleeve.

Other objects, features, and advantages of the invention will become apparent from a consideration of the following detailed description and from the accompanying drawings.

DETAILED DESCRIPTION

Figure 1:
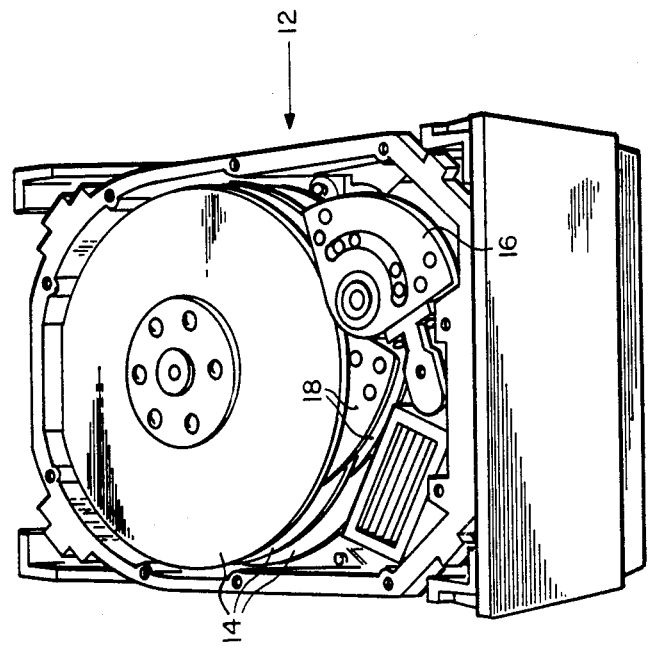
FIG. 1 is a showing of a Winchester or hard disk drive with the upper cover removed.

Referring more particularly to the drawings, FIG. 1 shows a disk drive unit 12 including a plurality of hard disks 14, and a head positioning mechanism 16. Magnetic heads, attached to the outer ends of the head positioning arms 18 are moved substantially radially with respect to the center of the disks 14 under the control of the actuator 16, in order to shift all of the heads secured to the arms 18 together, across the magnetic surfaces of the disks 14. In accordance with well-known practice in the field of Winchester or hard disk drives, each of the intermediate arms 18 is provided with two magnetic heads, one to interact with the lower surface of the upper disk and the second head to interact with the upper surface of the next lower disk. One surface of the disks is normally reserved as a servo track disk surface, which is employed in controlling the positioning of the heads and the reading and writing which is accomplished by the remaining heads. Of course, all of this is well known in the field of Winchester, or hard disk drives. The disk drive shown in FIG. 1 is of the type manufactured by the assignee of the present invention.

Figure 2:
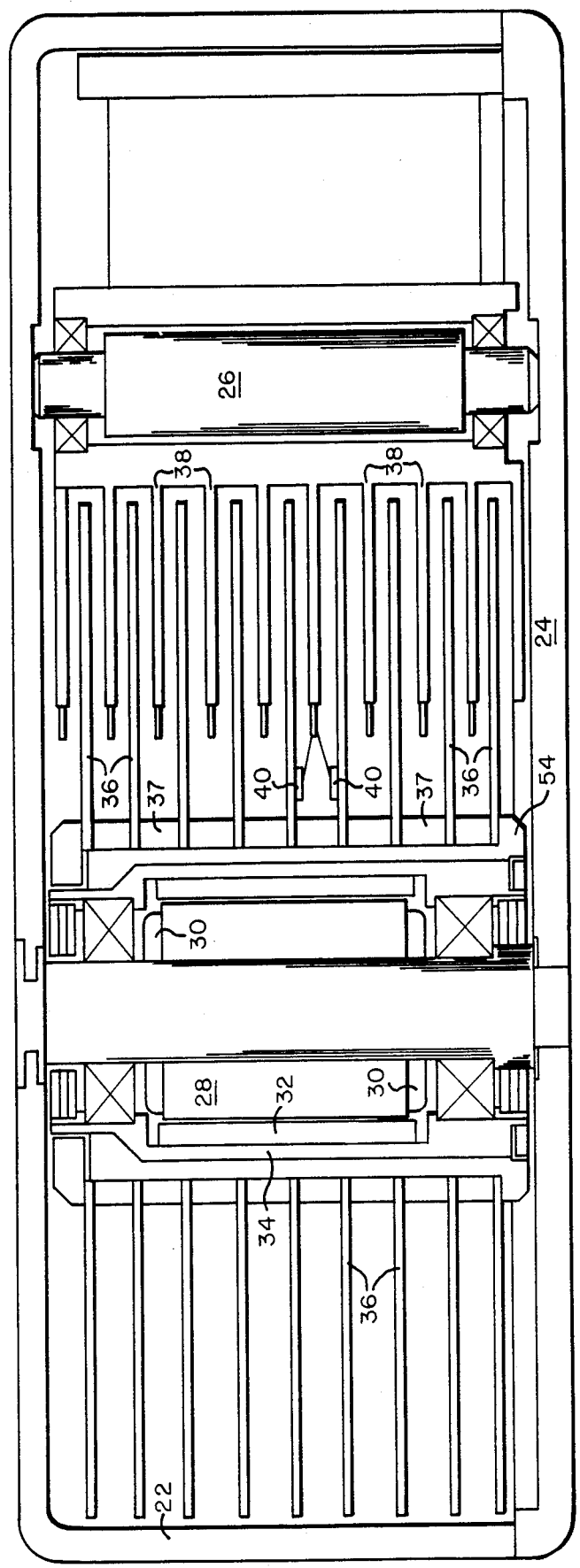
FIG. 2 is a cross-sectional view of a Winchester or hard disk drive illustrating the principles of the present invention.

FIG. 2 is a cross-sectional view of a Winchester or hard disk drive illustrating the principles of the present invention. Shown in FIG. 2 is the housing 22 and the upper housing closure plate 24 which seals the unit. Within a housing is the head positioning mechanism 26 of the type shown in FIG. 1 at reference numeral 16, and a central motor 28 including coils 30 forming part of the central stator structure, and the rotor structure including permanent magnets 32 and an outer steel sleeve 34. Secured to the rotor 32, 34 in a manner to be described hereinbelow, are nine aluminum memory disks 36. Extending from the head positioner 26 between the disks 36 are a series of magnetic head supporting arms 38. Secured to each of the magnetic head supporting arms 38 which extend between aluminum recording disks 36 are a pair of magnetic heads, such as those shown at reference numeral 40, mounted on one of the arms 38. The upper and lowermost arms 38 would only have one magnetic head to engage the exposed surface of the adjacent disk, while all the other mounting arms 38 would have two magnetic heads of the type shown at 40, to engage the two facing surfaces of the memory disks 36. Incidentally, all of the arms 38 normally move together, and, as mentioned elsewhere herein, one of the disk surfaces and mating heads acts as a servo system to control the position of the arms 38 through the head positioner 26.

Figure 3:
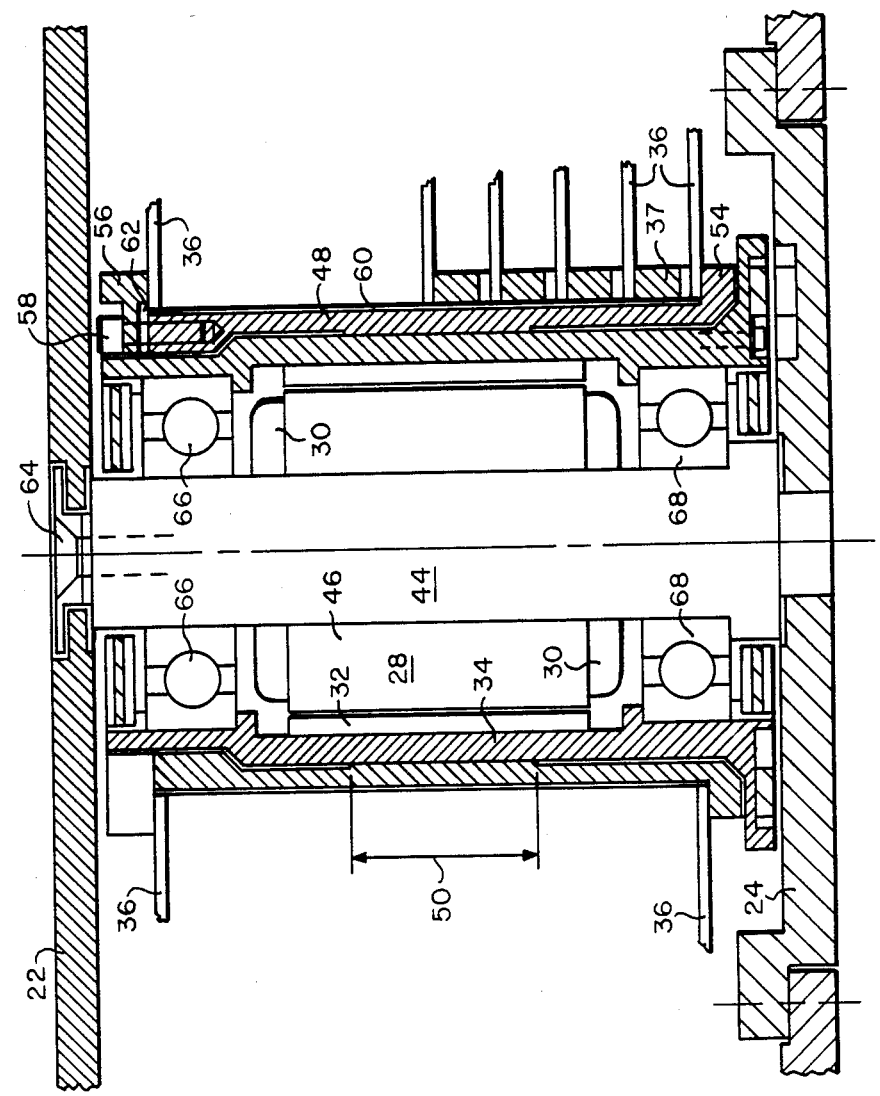
FIG. 3 is a detailed cross-sectional view of the central hub of the drive of FIG. 2.

The configuration of the inner portion of the motor assembly will now be considered in greater detail in connection with FIG. 3 of the drawings. The motor 28, includes the central steel shaft 44 which is fixed to the housing 22 and has the steel poles 46 and the windings 30 associated therewith. The motor is a brushless DC motor having an enclosing four pole permanent magnet rotor which, as mentioned above, includes the permanent magnets 32, and the surrounding steel cylindrical member 34. The central stator may, for example, include 15 slots or 12 slots, with the steel structure being provided with windings which are energized under the control of Hall effect sensors, to control the energization of selected windings to rotate the rotor and the memory disks which are secured thereto.

An aluminum disk mounting sleeve 48 is secured to the cylindrical steel member 34 over the central overlapping distance indicated by the line segment 50, constituting approximately half of the overlapping area of the cylindrical member 34 and the enclosing aluminum sleeve 48. The remaining distance of overlap of the aluminum sleeve 48 and the cylindrical steel member 34 is provided with a clearance of several thousandths of an inch, above and below the area indicated by the arrows 50, so that, as the temperature of the unit cycles, there will be no engagement between the steel and aluminum parts except in the central zone. The aluminum sleeve 48 and the cylindrical steel member 34 are preferably secured together by heat shrinking the two members together. Thus, the two parts are initially carefully machined to have a slight interference fit at the upper end of the temperature band within which the units are to be exposed, and then the aluminum sleeve is heated to a temperature in the order of 300 degrees F. so that it may be readily slid over the steel member. Once they are accurately positioned relative to one another, the unit is permitted to cool down to room temperature where the aluminum sleeve will be tightly and permanently mounted onto the inner steel cylindrical rotor member.

The aluminum hard disks 36 together with their associated spacers 37 are mounted to the aluminum sleeve 48 by clamping between the lower flange 54 and the clamping member 56 which is secured to the upper edge of the aluminum sleeve 48 by a set of six cap screws 58 which may be evenly spaced around the enlarged or end of the aluminum sleeve 48. As mentioned above, there is a considerable space or clearance of at least several thousandths of an inch between the inner diameter of the disks 36 and the spacers 37, and the outer diameter of the aluminum sleeve 48. This clearance is indicated at reference numeral 60 in FIG. 3. In practice, the disks and the spacers are held in concentric positions with regards to the inner assembly from their outer edges, while the cap screws 58 are tightened to bring the clamping member 56 into firm engagement with the upper disk, and clamp the entire assembly together. In this regard, it may be noted that the clamping member 56 has a T-shaped cross-section, with clearance 62 between the inwardly directed portion of clamping member 56 and the enlarged upper end of the aluminum sleeve 48, to insure full clamping pressure being applied to the disks and their spacers.

Incidentally, the central fixed steel rod 44 is fixedly mounted to the housing 22 by any suitable arrangements, which as shown in FIG. 3 may include the threaded fastener 64. The upper and lower bearing assemblies 66 and 68 permit the easy rotation of the rotor portion of the motor and the hard disks, relative to the inner fixed stator portion of the motor, including the central steel shaft 44 and the motor coils 30. Incidentally, the bearings 66 and 68 are normally designed to operate with a certain level of pre-loading, and the isolation of the bearings from the differential forces which could otherwise arise from the large thermal coefficient of expansion of aluminum, is a collateral advantage of the present invention.

It is also noted that the system of the present invention has a storage capacity of up to approximately 382 megabytes (unformatted) or up to 344 megabytes (typical format), as compared with approximately 170 megabytes for prior similar hard disk drives of the type mentioned above having only five disks. Further, the increased storage capacity is accomplished within the industry standard dimensions as set forth hereinabove.

In conclusion, it is to be understood that the foregoing detailed description relates to an illustrative preferred embodiment of the invention. Various alternative constructions for implementing the invention could include, for example, the use of separate clamping members at both the top and bottom of the aluminum mounting sleeve, or the use of an additional concentric aluminum sleeve spaced with a slight clearance from the mounting sleeve, to which the hard disks and spacers are firmly secured, to form a unitary disk assembly which would be mounted as a unit to the mounting sleeve 48 as shown in the drawings. It is also noted that the rotor member could be of another magnetic material other than steel, and the disks may be of an alloy or other material rather than aluminum. Another alternative would involve securing the aluminum mounting sleeve to the steel rotor member by glue such as epoxy glue, rather than by a thermal shrink fit. Accordingly, the present invention is not limited to the precise embodiment shown in the drawings and described in detail hereinabove.

What is claimed is:

1. A high capacity digital storage system of the Winchester or hard disk type, comprising:
   an inner motor including an outer cylindrical steel member forming part of the motor rotor;
   an aluminum disk mounting sleeve having a substantial length which is coextensive with said steel member, said aluminum sleeve making a thermal shrink fit engagement with said cylindrical steel member toward the center of their overlapping areas, and having clearance between the sleeve and member at their two ends;
   a plurality of aluminum storage disks; and
   means for mounting said storage disks from the upper and lower ends of said aluminum mounting sleeve, with the storage disks being aligned with and spaced from one another and with a clearance from the periphery of said aluminum mounting sleeve.

2. A high capacity digital storage system of the Winchester or hard disk type as defined in claim 1 further comprising magnetic head means for writing digital information onto said disks and for reading digital information from said disks.

3. A high capacity digital storage system of the Winchester or hard disk type as defined in claim 1 wherein said aluminum disk mounting sleeve has a flange at one end, and clamping means are provided at the other end of the sleeve to clamp the aluminum storage disks against the flange.

4. A high capacity digital storage system of the Winchester or hard disk type as defined in claim 1 wherein said engagement between said sleeve and member extends for approximately one-half of the overlapping area of said sleeve and said member.

5. A high capacity digital storage system of the Winchester or hard disk type as defined in claim 1 wherein said engagement between said sleeve and member extends for between $\frac{1}{4}$ and $\frac{3}{4}$ of the overlapping area of said sleeve and said member.

6. A high capacity digital storage system of the Winchester or hard disk type as defined in claim 1 wherein said disks substantially enclose said motor from one end of said motor to the other end thereof.

7. A high capacity digital storage system of the Winchester or hard disk type as defined in claim 1 wherein said disks are coaxial with and generally coextensive with said motor.

8. A high capacity digital storage system of the Winchester or hard disk type as defined in claim 1 wherein said motor is a brushless D.C. motor and wherein the motor rotor includes permanent magnet means mounted to and within said cylindrical steel member.

9. A high capacity digital storage system of the Winchester or hard disk type, comprising:
   an inner motor including an outer magnetic member forming part of the motor rotor;
   a disk mounting sleeve having a substantial length which is coextensive with said steel member, said sleeve making a thermal shrink fit engagement with said magnetic member toward the center of their overlapping areas, and having clearance between the sleeve and member at their two ends, said mounting sleeve being formed of a material which has a substantially different coefficient of thermal expansion than said magnetic member;
   a plurality of rigid storage disks; and
   means for mounting said storage disks from the upper and lower ends of said mounting sleeve, with the storage disks being aligned with and spaced from one another and with a clearance from the periphery of said mounting sleeve.

10. A high capacity digital storage system of the Winchester or hard disk type as defined in claim 9 further comprising magnetic head means for writing digital information onto said disks and for reading digital information from said disks.

11. A high capacity digital storage system of the Winchester or hard disk type as defined in claim 9 wherein said disk mounting sleeve has a flange at one end, and clamping means are provided at the other end of the sleeve to clamp the storage disks against the flange.

12. A high capacity digital storage system of the Winchester or hard disk type as defined in claim 9 wherein said engagement between said sleeve and member extends for between ¼ and ¾ of the overlapping area of said sleeve and said member.

13. A high capacity digital storage system of the Winchester or hard disk type as defined in claim 9 wherein said disks are coaxial with and generally coextensive with said motor.

14. A high capacity digital storage system of the Winchester or hard disk type comprising:
an inner motor including an outer cylindrical steel member forming part of the motor rotor;
an aluminum disk mounting sleeve having a substantial length which is coextensive with said steel member, said aluminum sleeve being secured to said cylindrical steel member toward the center of their overlapping areas, and having clearance between the sleeve and member at their two ends;
a plurality of aluminum storage disks; and
means for mounting said storage disks from the upper and lower ends of said aluminum mounting sleeve, with the storage disks being aligned with and spaced from one another and with a clearance from the periphery of said aluminum mounting sleeve.

15. A high capacity digital storage system of the Winchester or hard disk type as defined in claim 14 further comprising magnetic head means for writing digital information onto said disks and for reading digital information from said disks.

16. A high capacity digital storage system of the Winchester or hard disk type as defined in claim 14 wherein said aluminum disk mounting sleeve has a flange at one end, and clamping means are provided at the other end of the sleeve to clamp the aluminum storage disks against the flange.

17. A high capacity digital storage system of the Winchester or hard disk type as defined in claim 14 wherein said engagement between said sleeve and member extends for approximately one-half of the overlapping area of said sleeve and said member.

18. A high capacity digital storage system of the Winchester or hard disk type as defined in claim 14 further comprising a central fixed steel shaft, means for mounting the stator of said motor fixedly on said shaft, and steel bearing means for mounting the motor rotor to rotate around and in close proximity to said stator, said bearing means being mounted on said shaft above and below said stator.

* * * * *